Patented May 6, 1952

2,595,786

UNITED STATES PATENT OFFICE 2,595,786

TREATMENT OF TOPPED OXO ALCOHOL WITH MOLECULAR OXYGEN AND CAUSTIC

Cecil H. Hale and Charles E. Starr, Jr., Baton Rouge, La., assignors to Standard Oil Development Company, a corporation of Delaware No Drawing. Application June 1, 1950, Serial No. 165,608

9 Claims. (Cl. 202—57)

The present invention relates to an improved treatment for oxygenated organic compounds prepared by the Oxo reaction which consists of contacting carbon monoxide and hydrogen with olefinic hydrocarbons in the presence of a carbonylation catalyst. The aldehyde product so obtained is preferably thereafter subjected to catalytic hydrogenation. More specifically, the invention relates to an improved method for purification of primary Oxo alcohols, specifically octyl alcohols, by superatmospheric and high temperature treatment of such alcohols with an oxygen-containing gas such as air, either in conjunction with or followed by a caustic treatment, followed by distillation of the treated alcohol at atmospheric or under reduced pressure. This method has been found to be especially useful for improving the color of the esters prepared from the treated alcohols and for reducing the sulfur content of the alcohol product made by the synthetic Oxo reactions.

The treatment is effective when applied to the topped crude alcohol or to the finished alcohol. When the method is applied to the crude alcohol prior to a topping operation, or other customary finishing operations, it gives a product of somewhat inferior quality. The pressure treatment is most effective when used on the topped alcohols in conjunction with a distillation finishing step. The lowered alcohol column bottoms temperature obtainable under vacuum is advantageous in that it minimizes thermal decomposition of the deleterious compounds being rejected in the bottoms stream.

Primary alcohols prepared by the Oxo process are of great economic importance and of commercial interest because of their use as intermediates in the manufacture of plasticizers of the diester type by their esterification with dibasic acids. Previously, these alcohols have been supplied mainly by such comparatively costly procedures as aldol condensation of butyraldehydes, followed by dehydration and hydrogenation of the unsaturated actyl aldehyde.

The synthesis of oxygenated organic compounds from olefinic compounds and mixtures of carbon monoxide and hydrogen under suitable conditions is well known in the art. The olefinic starting material is allowed to react in the liquid state with carbon monoxide and hydrogen in the presence of a metal catalyst, usually an iron group metal catalyst, such as a suitable cobalt compound to form, in a first or oxonation stage, organic carbonyl compounds such as aldehydes, ketones, and acids having one carbon atom more per molecule than the olefinic feed material together with some condensed higher molecular weight products such as ethers, acetals, hemiacetals, and esters. The carbonyl compounds which predominate in the product are then subjected to hydrogenation in a second stage to produce the corresponding alcohols, usually in a rather impure state together with many impurities.

Practically all types of organic compounds having an olefinic double bond may be used as starting materials to the first or oxonation stage, including aliphatic olefins and diolefins, cycloolefins, aromatics with olefinic side chains, oxygenated compounds having olefinic double bonds, etc. The metal catalyst is preferably used in the form of a fatty acid salt soluble in the olefinic feed stock, such as the naphthenates, stearates, oleates, etc. of cobalt, iron or nickel. Suitable general reaction conditions include temperatures of about 150°–450° F., pressures of about 100 to 300 atm., $H_2:CO$ ratios of about 0.5–4.0:1, liquid feed rates of about 0.2–5 v./v./hr. and gas feed rates of about 1,000–45,000 standard cu. ft. of $H_2+CO$ per barel of liquid olefinic feed.

The hydrogenation stage may be operated at conventional hydrogenation conditions which include temperatures, pressure, gas and liquid feed rates approximately within the ranges specified above for the first stage. Various known types of hydrogenation catalysts including nickel, tungsten, molybdenum, their oxides and sulfides, and others may be used. The liquid product from the hydrogenation stage is worked up by distillation to separate the desired alcohols from unconverted olefinic feed material, unhydrogenated carbonyl compounds, and hydrocarbons formed in the process.

The over-all carbonylation or so-called "Oxo" reaction as outlined above, provides a particularly effective method for preparing valuable primary alcohols, particularly of the $C_4$ to $C_{20}$ range, which find large markets as intermediates for detergents and plasticizers. The $C_8$ and $C_9$ Oxo alcohol products are especially preferred for use in forming esters to be used as plasticizers in light-colored or colorless plastics and resins.

For certain types of olefin feeds, the reaction conditions have been found to be quite critical and specific. For instance, the conversion of heptenes to octyl alcohols by reaction with carbon monoxide and hydrogen in the presence of cobalt catalyst to form octyl aldehydes, followed by hydrogenation of the aldehydes to alcohols, has been found to give best olefin conversion levels in the first, or carbonylation stage of the reaction within a rather narrow range of temperature, when the other conditions of the reaction such as contact time, total pressure, hydrogen to carbon monoxide ratios and cobalt concentrations have been appropriately selected. Within the aldehyde reactor, under the conditions of the reaction, the dissolved catalyst is decomposed and converted to cobalt carbonyls, which probably are the active carbonylation agents. The carbonyls are soluble in the liquid within the reactor and are removed from the reaction zone mainly dissolved in the effluent product. A smaller proportion of the cobalt carbonyl is also removed from the reaction zone by the exit gas stream.

Serious difficulties have been encountered in the hydrogenation stage as a result of sulfur poisoning of the hydrogenation catalyst, when the catalysts used are those such as nickel and others which are sulfur sensitive. The most readily available olefinic feed stocks for the oxonation reaction are selected hydrocarbon streams derived from petroleum refinery sources and these frequently have sulfur contents as high as 0.1% or even higher. Furthermore, there are a variety of other ways in which sulfur may be introduced into the alcohol product during both the oxonation and hydrogenation stages. For instance, the fatty acids used to form the metal oxonation catalyst for the purpose of introducing the metal into the reactor as the metallic naphthenate, stearate, or oleate, will usually be found to contain small amounts of sulfur-containing compounds as contaminants, particularly when the fatty acids themselves are of petroleum origin as they frequently are. The synthesis gas used in the oxonation zone which is primarily a mixture of carbon monoxide and hydrogen also may contain sulfur impurities and, in fact, the gaseous reactants employed in both stages of the Oxo reaction usually contain at least traces of sulfur impurities.

Any sulfur which is present in the crude reaction mixture containing the carbonyl compounds, is carried through the oxonation stage into the hydrogenation stage where it combines with the hydrogenation catalyst to reduce and even completely destroy catalyst activity unless sulfur-insensitive catalysts are used. The sulfur-sensitive catalysts are generally of the metallic type and the deactivating effect of the sulfur on their activity requires frequent reactivation, catalyst replacement, and increased amounts of a catalyst whose cost is definitely a commercial factor and may be prohibitively high. Thus, it is considered necessary for optimum operation in the hydrogenation step to employ a sulfur-insensitive catalyst. These sulfur-insensitive catalysts include particularly certain metallic sulfide hydrogenating catalysts, examples of such catalysts being nickel sulfide, molybdenum sulfide and tungsten sulfide. While these catalysts have the decided advantage of avoiding the inactivation due to sulfur content of the feed stock, they also possess the disadvantage that they permit the sulfur to pass unchanged through the hydrogenation zone and, indeed, in many cases, tend to introduce additional sulfur contamination into the alcohol. Thus, the final crude alcohol may have a total sulfur content of from 30 to 100 p. p. m., or in some cases, an even higher value if no sulfur clean-up operations are done.

One of the largest and most important uses developed for the synthetic alcohol products is that of producing esters suitable for plasticizers, by reaction with both aliphatic and aromatic acids or anhydrides including such examples as phthalic acid, maleic acid, adipic acid, and also phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols of from $C_4$ to $C_{12}$ range such as the butyl alcohols, the octanols and the nonanols.

These esters are prepared in standard type esterfication equipment employing reactors made of stainless steel or other metal or, in some cases, in glass-lined reaction vessels.

In a number of instances, particularly when the esters were produced in reactors having metallic surfaces exposed to the reacting mixtures, the products were found to be deficient as to the standards required for plasticizers, in such characteristics as odor, color, and plasticizing qualities such as the poor weathering tendency of the resins and plastics in which such plasticizers are used. These undesirable characteristics are believed to be caused by impurities present in the alcohol product and certain of them are caused particularly by the sulfur products present in the alcohol, although other materials which can affect ester color and odor include polymerized and condensed higher molecular weight impurities as well as unreduced carbonyl compounds and other non-alcoholic compounds. It has further been discovered that when sulfur compounds, especially those of the acidic type, are allowed to remain in impure alcohol or aldehyde, they act as catalysts for causing increased condensation reactions which produce acetals and other high molecular weight impurities of the undesirable type. In fact, it has been found that, in order to obtain a high grade alcohol which adequately meets all specifications, the active, color-producing sulfur content should best be reduced to a value somewhere near 5 parts per million, although somewhat higher total sulfur concentrations can be tolerated, the exact limit of tolerance depending partially upon the form in which the sulfur occurs. Only certain types of the sulfur-containing impurities seem to be among the most active color formers.

In general, the sulfur in the synthetic Oxo alcohols is in the form of organically combined sulfur. Although the type of organic impurities in which the sulfur occurs has not been fully determined, it is believed that the sulfur is present in a variety of forms and that it is generally deleterious in all forms when occurring in the final alcohol. Sulfur-containing contaminants cause both odor and color problems as well as act as accelerators to give unwanted properties. The more highly alkylated and less acidic sulfur materials appear to be less active in producing colored impurities in stainless steel and other kinds of metallic equipment. The finished alcohol should contain a minimum of sulfur-containing compounds. It is also the best practice to remove most of the carbonyl compounds in order to obtain alcohols which give acceptable ester plasticizers. These purifications are especially necessary if the ester is manufactured in stainless steel equipment and unreacted or excess alcohol is recycled to the esterification zone. A number of types of sulfur-containing impurities are believed to be present and among those probable in an isooctyl alcohol product prepared from a $C_7$ olefin, are isooctyl mercaptan, isooctyl sulfide, diethyl sulfide, diethyl disulfide, dipropyl sulfide, dipropyl disulfide, butyl sulfide, as well as the corresponding sulfinic acids, sulfonic acids, sulfoxides, and sulfones. The mercaptans and less highly reduced forms of sulfur are more to be found in newly manufactured alcohols, while the alcohol products which have been stored or otherwise allowed to stand will tend to darken and accumulate the more highly oxidized forms of sulfur.

In typical alcohol recycle esterification operations, a 1% to 20% molal excess of alcohol is used based on the quantity of phthalic anhydride used. The esterification reaction is carried to substantial completion by esterification for a sufficient time. The unreacted alcohol is then stripped off from the ester product under reduced pressure and blended with fresh alcohol for returning to the esterification zone. Thus, undesirable color and odor forming materials, including sulfur-containing impurities, have the opportunity to build up during the recycle stages to a point at which they must be purged from the system before continuing the recycling operation. This presents impurity problems which occur even though the actual reaction is carried out in corrosion resistant or glass-lined equipment. The high temperature esterification is a much more severe test as to the purity and stability of the reactants, and is more truly representative of typical plant scale esterification conditions.

There are regularly used a number of modified esterification procedures. Two of the main ones which are widely used for preparation of the dioctyl phthalate ester include the high temperature method in which the one mole of phthalic anhydride is heated with approximately 2 to 2.4 moles of octyl alcohol. The ester may be prepared in a number of ways. In one such method, the ester is recovered by distilling, first, the unreacted alcohol and anhydride, then finally, if it is so desired, by distilling the ester under reduced pressure. It is preferred to use the ester without distilling it, and this can be done if the alcohol used in the esterification is of sufficient purity. Although a number of finishing techniques are used, in all cases unreacted alcohol is distilled off for recycle. The catalytic method in which benzene sulfonic acid or a similar type material is used as a catalyst may be employed to give catalytic esterification at a lower temperature. The color degradation of isooctyl alcohol during esterification has also been found to be a function of time and completeness of esterification. The highly purified isooctyl alcohol products, such as those made from alcohol purified through the borate ester or prepared over a sulfur-sensitive metallic hydrogenation catalyst, show practically no color degradation in any method of esterification. Such refined methods of production are, however, prohibitively expensive for large scale commercial production.

In order to test the effectiveness of a treatment for removing sulfur and sulfur-containing impurities from Oxo alcohol products, it has been found that accelerated esterification tests can be carried out which simulate the conditions present during large scale commercial esterifications, particularly in reactors in which the esterification mixture is exposed to metallic surfaces. One such test consists in carrying out the esterification for a suitable time and at the required temperatures in the presence of suitable metallic chips, the standard esterifications being done in glass type reactors. The chips preferably used and those which give the most reproducible results are of the KA2S stainless steel type. This test is considered to be the most rigorous and gives the most complete test of alcohol quality when the impurities being tested for are of the sulfur type.

It has now been discovered that undesirable color characteristics of primary alcohols prepared by the Oxo reaction containing impurities, particularly those of the sulfur-containing and color-forming type, can be essentially eliminated and a good grade of alcohol produced. This novel and improved treatment consists of an operation comprising treating the alcohol with an oxygen-containing gas, as with air itself, the treatment being carried out at elevated temperatures and at superatmospheric pressures. It is also highly important that the alcohol be subjected to a caustic treatment either in conjunction with or immediately following the treatment with oxygen-containing gas. It is further necessary that the improved treatment be carried out on an Oxo alcohol which is either of the topped crude type, that is, with the low-boiling impurities removed, or of the finished alcohol type from which the high-boiling bottoms have also been removed by distillation of the alcohol. As a further feature of this invention, it is contemplated that following the air-caustic treatment, the treated alcohol should be further subjected to a distillation, either at atmospheric pressure or under vacuum.

It is considered important that the improved air-caustic treatment be applied only to alcohol from which components boiling substantially below the boiling point of the alcohol being treated have been removed. This is preferably done by conducting a topping operation in a regulation rectifying column from which the materials more volatile than the alcohol are removed as an overhead stream and from which the materials boiling substantially in the range of the alcohol and somewhat above, are taken either as a side stream or as a bottoms fraction. In the latter case, the alcohol will necessarily require more careful distillation following the air-caustic treatment, since the major portion of the high-boiling bottoms will be carried along in the alcohol fraction. If the alcohol is subjected to this improved treatment without the necessary preliminary topping operation, the air-caustic treatment results in a product improved to a lesser degree. The application of the improved treating procedure to topped crude alcohol is advantageous from the standpoint of eliminating the possible formation of an explosive mixture of oxygen and the light hydrocarbons.

In addition, it has been determined that in order to realize the maximum advantages of this invention, it is highly desirable to follow the oxygen-caustic treatment under pressure and elevated temperatures by a distillation in which the alcohol product is taken from the rectification column either as an overhead stream or as a side stream from near the top of the column. If such a distillation operation is not used to treat the alcohol following the air-caustic treatment, the alcohol may contain certain undesirable impurities, some of which were originally present in the crude and some of which are formed or converted into other compounds during the treatment.

While it is not known with complete certainty the exact effects which this treating method exerts in order to produce the desired high grade alcohol which is relatively free of undesirable impurities causing ester color and which has a substantially reduced sulfur content, it is believed that at least a part of the action is the result of reactions of the sulfur-containing impurities in the presence of the oxygen to give products and derivatives which have increased caustic solubility or higher boiling points and which are thus removed much more efficiently from the alcohol by the separation with the caustic solution by the simultaneous or separate washing steps and by subsequent distillation operation. It is particularly remarkable that in carrying out this improved process, the beneficial effect of the oxygen treatment together with sodium hydroxide treatment is shown to a much greater extent when the combined treatment is carried out under somewhat elevated temperatures and superatmospheric pressures. While it is not certain just why the effect of the treatment is much more outstanding when used at elevated temperatures and pressures substantially above atmospheric, one explanation may be that under the elevated pressures the gaseous oxygen used in the treatment may be rendered more soluble in the liquid-alcohol phase or the alcohol-caustic phase and thereby during the period of exposure of the alcohol to the oxygen, more ample opportunity is given for the beneficial effects to take place. Under these more strenuous conditions, it is further believed that a substantially larger percentage of the deleterious sulfur-containing impurities is converted to more acidic compounds such as the sulfur-containing acids which show substantially higher solubility in the caustic treating liquid than do the less acidic sulfur compounds initially present in the alcohol or which might be obtained under less strenuous oxidative conditions. The marked improvement in alcohol purity is indicated by the improvement in the Hazen ester color of the phthalate ester, as can be determined when the esters are prepared from phthalic anhydride and the treated isooctyl alcohol with stainless steel chips present in the esterification during the reaction.

It is also possible to employ pure oxygen or synthetic mixtures of oxygen, plus an inert gaseous diluent such as nitrogen rather than air. Both from the effectiveness of treatment and convenience, as well as economy of operation, it is much preferred to employ air as the treating agent.

It is particularly unusual and unexpected that this high pressure treatment with an oxygen-containing gas and a caustic solution shows such good purification effects with the Oxo alcohols, most of which are in the water-immiscible alcohol class, such as those of the $C_8$ and $C_9$ types, although in most cases there are two phases present during the treatment stage, the use of elevated temperatures and superatmospheric pressures tends to give more homogeneous mixtures during the treatment. It is further surprising and unexpected that following such a treatment of the alcohol, there can be effected essentially complete recovery of the Oxo alcohol being treated. This indicates that a comparatively small portion of the alcohol undergoes degradative attack during the treatment. Such a treatment would, however, be less desirable for purification of the lower molecular weight alcohols which show remarkably greater water-miscibility since a less selective purification would be obtained and at least a part of the alcohol would be more readily attacked by the oxygen and by the caustic used in the treatment operation. Both the octyl and nonyl alcohols are stable towards the treatment and at the same time, the color-producing impurities are generally quite unstable and reactive toward the treating agents.

In carrying out a preferred embodiment of this invention, the treatment is used to purify an alcohol which is produced by the Oxo synthesis, that is, by the oxonation of an olefin with carbon monoxide and hydrogen followed by hydrogenation. Prior to the treatment, it is necessary that the crude alcohol taken from the hydrogenator must undergo at least one topping operation, that is, a distillation operation in which the substantial proportion of materials more volatile than the alcohol itself is removed by volatilization. The resulting topped alcohol is then contacted with an oxygen-containing gas and preferably with simultaneous exposure to an aqueous caustic solution. The treatment is carried out under strenuous conditions of temperature and pressure. The treatment operation should be permitted sufficient time in order that the action of the air and caustic can effect the conversion of impurities to appropriate derivatives in order that they may be removed subsequently to give finished alcohol. Following the treatment operation, the alcohol is subjected to a fractionation at either atmospheric or reduced pressure from which the finished alcohol is removed either as a side stream or preferably as an overhead vapor stream, and the high-boiling bottoms are withdrawn from the lower portion of a distillation column.

It is considered to be relatively satisfactory that the treatment may be carried out by contacting the finished alcohol with oxygen at approximately 125 p. s. i. g. and for a period of time of approximately 16 hours at a temperature of about 100° C. without a subsequent caustic treatment. In this case, a noticeable improvement in the sulfur content was attained. In addition, the ester color, as measured by the adsorbency of the phthalic anhydride ester at 4470 Å., was shown to be substantially better than that of the untreated alcohol. Under similar oxidation conditions, when the treatment is carried out using an equal volume of 10% NaOH, a marked improvement in sulfur content and in ester color qualities was also shown by a similar alcohol product.

In case it is felt desirable to use the caustic in conjunction with the oxidation, an aqueous solution of sodium hydroxide of from 10 to 50 weight per cent caustic strength is considered to be most desirable. Low concentrations of alkali may result in incomplete improvement as well as some troublesome emulsion formation, particularly if a gas is passed violently through the alcohol at the same time. The treatment with air and with any caustic solution should be carried out such that fast and thorough mixing of the two phases is assured. At the same time, it is highly desirable to avoid emulsion formation, such as by adding an emulsion inhibitor to the system and thereby preventing difficulties in separation of the two phases. If it is desired to carry out a continuous operation, the treating process can be employed with arrangement for injecting air or other oxygen-containing gases either at a single location or at a plurality of locations in the equipment.

Contact time necessary to produce a good quality alcohol and one which can be converted to an ester which will meet the requirements of color, varies and depends both on the concentration and type of impurity in the alcohol as well as their individual susceptibility to the oxidative treatment. Other variables which require control during the treatment include concentration of caustic solution, the elevated temperature conditions, superatmospheric pressures, the volume of air or other oxygen-containing gas used per unit of alcohol being treated, holding time for the oxidative treatment, and the detailed mode of operation of the rerun distillation column to be used on the treated alcohol. For instance, in general, the longer the time of exposure to the oxidation and the caustic, if used, the better the quality of alcohol obtained. Contact times of from at least one and up to 24 hours, should be employed for best results; times of from 16 to 24 hours have been shown to be preferable for obtaining the greatest amount of quality improvement. It must always be kept in mind that the economies of a process such as this are such that the treating time can not be excessive. The time features can be readily adjusted by varying the caustic concentration, the volume input of treating air, and the treating temperatures and pressures.

The temperature at which the treating operation is carried out is considered to be a critical variable in that a sufficiently high temperature must be employed in order to provide a treating operation which will produce maximum results in alcohol quality improvement. The best results have been found to be obtained at temperatures of from 100°–250° C.

It is considered to be of major importance that a sufficient amount of caustic must be used to effect the removal of substantially all alkali-sensitive impurities. This limitation obviously only applies in cases where a caustic washing either accompanies or follows the oxidative treatment. A very large excess of caustic will be uneconomical and can readily cause loss of alcohol product. Generally, for the average grade of topped Oxo alcohol, the amount of caustic which may be used varies from 0.5 to 50 volume per cent, based on the alcohol being treated. Typical ratios employed are about equal parts of alcohol to aqueous alkali. The amount of air required is preferably 1 to 100 times the theoretical amount necessary to convert the sulfur present as mercaptan sulfur to a sulfur acid derivative. This is intended merely as a general expression for the conversions involved in the sulfur derivatives. In general, it is desirable to have an excess of air, since it is not always possible to determine accurately the exact amount of mercaptan sulfur present as alcohol impurity.

The treatment is necessarily carried out at superatmospheric pressures in suitably constructed pressure equipment. The pressures which are preferable to use are in the range of atmospheric to 300 p. s. i. g. With reference to the subsequent distillation operation following the oxidative treatment, over-all best results are obtained when this distillation is carried out under reduced pressure. It is contemplated to be within the scope of this invention to carry out successive oxidative and caustic treatments on the alcohol. Since the alcohol undergoing treatment will ordinarily be at least partially water-immiscible and therefore will be relatively insoluble in the caustic wash solution, the alcohol and caustic mixture is taken to a phase separator or settling tank in which there are formed two phases, an aqueous caustic phase containing dissolved impurities removed from the alcohol and the spent caustic solution, and an organic phase of purified alcohol.

The aqueous phase is separated and reused as wash liquid, if desired, provided it is not completely spent by adsorption of reactive impurities in the alcohol. Following any caustic washing, the alcohol, by the preferred mode of operation, is necessarily subjected to at least one water-washing to remove last traces of the caustic in solubilized impurities. At least one washing operation is especially necessary if the next step is to be a distillation or rectification of the alcohol, since during such distillation, the alkali content of the Oxo alcohol must be held to a minimum to avoid undesirable side reactions and decompositions in the column. By the preferred mode of operation, at least one distillation step will be employed, following the oxidative treatment.

The type of alcohol feed stock best adapted and generally those most requiring this type of treatment are the topped or finished alcohol mixtures derived from the so-called Oxo process. Generally, they are water-immiscible. This alcohol range includes alcohols above $C_4$. It is contemplated that the process will have the widest and most useful application to purification of Oxo type alcohols of $C_8$ and $C_9$ ranges, those alcohols having the most useful and desirable properties for making ester plasticizers. For instance, a typical $C_8$ Oxo alcohol feed stock purified by the method herein described, in order to give a product yielding ester plasticizers of high purity and improved qualities both in color and other plasticizing characteristics, may be exemplified as one produced from the Oxo synthesis using a $C_7$ olefin feed, the resulting crude alcohol having a boiling range of 150° F. to 800° F. and consisting essentially of 25% hydrocarbons, 60% alcohol boiling at 350°–372° F., and 15% high-boiling bottoms. The alcohols are branched chain isomers of octyl alcohol and are substantially all of the primary class. The 25% hydrocarbons are substantially all removed by the topping operation, which is necessary as a preliminary step to the oxidative treatment, and the 15% high-boiling bottoms are removed by the final distillation of the treated alcohol.

Although it is not considered absolutely necessary in certain cases, oxidation inhibitors such as those of the general, phenolic or amine type may be added to the treating operation in order to prevent undesirable extensive oxidation of the Oxo alcohol itself.

It has been found by actual experimental operation that the sulfur content of a topped alcohol can be markedly reduced and the remaining sulfur can be changed in type to a sulfur derivative having greatly reduced color degrading qualities, by a treatment with oxygen under pressure followed by distillation and also by treatment with air under pressure followed by distillation. It has also been found advantageous to use a caustic treatment in conjunction with pressure-oxygen treatment. For example, a finished alcohol which had been subjected to redistillation at atmospheric pressure, containing 33 parts per million of total sulfur, showed ester color developed by esterification with phthalic anhyride in the presence of stainless steel chips corresponding to an adsorbency of light at 4470 Å. of 1.0. When this material was subjected to a treatment with oxygen at 125 p. s. i. g. for 16 hours at an average temperature of 100° C., it was found that the sulfur content of the distilled alcohol was about 8 parts per million and the ester color absorbency was only 0.11. When a similar treatment was carried out, on an alcohol having 13 parts per million of sulfur and an ester color absorbency of 0.16, with the additional feature of using an equal volume of 10% sodium hydroxide, the sulfur content of the distilled alcohol was 2 parts per million and the ester color absorbency was reduced to a very low value, 0.06.

EXAMPLE

In typical modifications of the process, topped $C_8$ Oxo alcohol was treated with the treating agents as shown in the table, for the indicated times and temperatures. In each case, following the treatment, a heart cut was removed from the treated alcohol by distillation, in some cases, under vacuum distillation, and in other cases, with atmospheric distillation. After these treatings and rerun operations, the quality improvement of the Oxo alcohol was of a distinct and outstanding nature, both as to improvement in ester color developed in the presence of stainless steel chips and in the reduced sulfur content of the treated alcohol.

which was produced in a two-stage operation consisting of a first stage in which hydrogen, carbon monoxide, and an olefin are contacted in the presence of an oxonation catalyst forming a product predominantly aldehyde, and of a second stage in which the said aldehyde product is catalytically reduced with hydrogen to form the corresponding alcohol which comprises the liquid-phase intimate contacting of the topped alcohol with molecular oxygen at temperatures of from 100°–250° C. and pressures of from atmospheric to 300 p. s. i. g. and in conjunction with an aqueous caustic solution of from 10 to 50 weight per cent concentration at least once prior to distillation for a period of time sufficient that undesirable impurities, particularly those of the sulfur-containing class, are rendered substantially harmless as color-producing bodies in subsequent reactions of the alcohol.

3. A process for the treatment of a $C_8$ isooctyl primary alcohol containing sulfur impurities prepared by the Oxo process and from which substantially all components more volatile than the alcohol have been removed, which comprises the liquid-phase intimate contacting of the topped alcohol with molecular oxygen at temperatures of about 100° C. and pressures of about 125 p. s. i. g. for a period of time of approximately 16 hours and simultaneously thereto contacting the alcohol with an aqueous caustic solution of from 10

Table

TREATMENT OF $C_8$ ISOOCTYL ALCOHOL AT SUPERATMOSPHERIC PRESSURES

| Run No. | Starting Alcohol | Treatment | Pressure | Time, Hrs. | Temp., °C. | Sulfur, p. p. m. | Ester Color [1] Absorbency at 4470 Å. | Carbonyl Number |
|---|---|---|---|---|---|---|---|---|
| A. (1) | Finished | Redistillation | Atmospheric | | | 33 | 1.0 | |
| A. (2) | ...do | Pressure treatment with oxygen, distillation at atmospheric pressure. | 125 p. s. i. g. (Oxygen) | 16 | 100 | 8 | 0.11 | |
| B. (1) | ...do | Redistillation | Atmospheric | 16 | 100 | 13 | 0.16 | |
| B. (2) | ...do | Pressure treatment with oxygen + equal volume of 10% NaOH, distillation at atmospheric pressure. | 125 p. s. i. g. (Oxygen) | 16 | 100 | 2 | 0.06 | |
| C. (1) | Topped to remove light ends. | Vacuum distillation | Vacuum (10 mm. Hg.) | | | 18 | 0.21 | 2.7 |
| C. (2) | ...do | Treatment with 5 vol. per cent of 45% NaOH containing inhibitor and blown with air for 30 min., left to stand in presence of air for 24 hrs., distillation under vacuum. | Atmospheric (Air) | 24 | 32–38 | 13 | 0.21 | 0.8 |
| C. (3) | ...do | Same treatment as B. (2), but air held under 125 p. s. i. g. | 125 p. s. i. g. (Air) | 24 | 32–38 | 11 | 0.12 | 0.6 |

[1] Color developed by esterification with phthalic anhydride in the presence of stainless steel chips and measured as absorbency of light at 4470 Å.

What is claimed is:

1. A process for the treatment of a water-immiscible primary, $C_4$ to $C_{20}$ alcohol containing sulfur impurities produced by the Oxo process and from which components more volatile than the alcohol have been removed, which comprises the liquid-phase intimate contacting of the topped Oxo alcohol at temperatures of 100°–250° C. with an excess of molecular oxygen at superatmospheric pressures and with an aqueous caustic solution of from 10 to 50 weight per cent concentration at least once prior to distillation, whereby undesirable impurities, particularly those of the sulfur-containing class, are rendered substantially harmless as color-producing bodies in subsequent reactions of the alcohol.

2. A process for the treatment of a water-immiscible primary, $C_4$ to $C_{20}$ alcohol containing sulfur impurities from which components more volatile than the alcohol have been removed and to 50 weight per cent concentration, whereby undesirable impurities, particularly those of the sulfur-containing class, are rendered substantially harmless as color-producing bodies in subsequent reactions of the alcohol, and the total sulfur content of the topped alcohol is substantially reduced.

4. A process for the treatment of a water-immiscible primary, $C_4$ to $C_{20}$ alcohol containing sulfur impurities produced by the Oxo process and from which components more volatile than the alcohol have been removed, which comprises the liquid-phase intimate contacting of the topped alcohol at least once prior to distillation of the alcohol at temperatures of 100°–250° C. and superatmospheric pressures with an aqueous caustic solution of from 10 to 50 weight per cent concentration in the presence of molecular oxygen for a time sufficient such that undesirable impurities, particularly those of the sulfur-containing class, are rendered substantially harmless as color-producing bodies in subsequent reactions of the alcohol.

5. A process for purification of a topped alcohol having from 4 to 20 carbon atoms to be used for the esterification of organic acids and produced by the Oxo reaction followed by catalytic hydrogenation, giving a product containing sulfur impurities which cause undesirable colored impurities during subsequent esterification reactions, which comprises subjecting said topped alcohol at least once prior to distillation to a liquid-phase treatment with an aqueous caustic solution of from 10 to 50 weight per cent concentration, simultaneously aerating the alcohol by saturating with air at temperatures of from 100°–250° C. and pressures of about 125 p. s. i. g. for a period of time of from 1 to 24 hours, whereby the undesirable sulfur-containing impurties are converted to substances which are substantially ineffective to cause color formation during subsequent esterifications, washing the treated alcohol to remove the caustic treating solution, and thereafter subjecting the treated alcohol to distillation.

6. A process such as that described in claim 5 in which the topped alcohol being purified is an isooctyl alcohol intermediate for the manufacture of ester type plasticizers.

7. A process such as that described in claim 5 in which the treated alcohol is subjected to vacuum distillation.

8. A process for the treatment of a topped water-immiscible alcohol mixture containing predominantly $C_8$–$C_9$ alcohols produced by the Oxo reaction followed by hydrogenation giving a product predominantly alcoholic and containing sulfur impurities which give color when the alcohol is used for subsequent esterifications, which comprises the liquid-phase contacting of the topped alcohol with an aqueous sodium hydroxide solution of from 10 to 50 weight per cent concentration, simultaneously treating the alcohol with molecular oxygen, maintaining the temperature during the treating operation at about 100° C. and the pressure at about 125 p. s. i. g., permitting the sodium hydroxide solution to remain in contact with the air-saturated alcohol for a period of about 16 hours, washing the alcohol caustic-free, and passing the thus treated alcohol to a distillation stage from which the purified alcohol product substantially free of sulfur-containing, color-forming impurities is removed as an overhead vapor.

9. A process such as that described in claim 8 in which the water-immiscible alcohol is a mixture of $C_8$ alcohols derived by the Oxo reaction from a $C_7$ olefin stream of petroleum origin.

CECIL H. HALE.
CHARLES E. STARR, Jr.

REFERENCES CITED

The following references are of record in the file of this patent:

UNITED STATES PATENTS

| Number | Name | Date |
| --- | --- | --- |
| 1,199,271 | Hawley | Sept. 26, 1916 |
| 1,518,339 | Mann | Dec. 9, 1924 |
| 1,593,304 | Johns | July 20, 1926 |
| 1,833,331 | Park | Nov. 24, 1931 |
| 2,139,179 | Tulleners | Dec. 6, 1938 |
| 2,309,652 | Leum et al. | Feb. 2, 1943 |